United States Patent
McCloskey et al.

(10) Patent No.: US 10,235,086 B1
(45) Date of Patent: Mar. 19, 2019

(54) HEIRARCHICAL STORAGE FOR VIRTUAL TAPES

(71) Applicant: EMC Corporation, Hopkinton, MA (US)

(72) Inventors: Larry W. McCloskey, Billerica, MA (US); Igor Matveevskiy, Saint Petersburg (RU); Mikhail Tolstoy, Saint Petersburg (RU); Bruce Offhaus, Waldoboro, ME (US); Ralph Armstrong, Londonderry, NH (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 106 days.

(21) Appl. No.: 15/196,883

(22) Filed: Jun. 29, 2016

(51) Int. Cl.
*G06F 3/06* (2006.01)

(52) U.S. Cl.
CPC .......... *G06F 3/0649* (2013.01); *G06F 3/0605* (2013.01); *G06F 3/067* (2013.01); *G06F 3/0664* (2013.01)

(58) Field of Classification Search
CPC ..... G06F 3/06–3/0605; G06F 3/0607–3/0649; G06F 3/065–3/0664; G06F 3/0665–3/067; G06F 3/0671–3/0689; G06F 17/30–17/30997; G06F 2212/00–2212/7211
See application file for complete search history.

(56) References Cited

U.S. PATENT DOCUMENTS

| | | | | |
|---|---|---|---|---|
| 5,761,503 A * | 6/1998 | Fisher | ............. | G06F 3/0605 |
| 5,805,864 A * | 9/1998 | Carlson | ............. | G06F 3/0607 360/132 |
| 5,822,780 A * | 10/1998 | Schutzman | ....... | G06F 17/30952 707/999.002 |
| 5,829,046 A * | 10/1998 | Tzelnic | ............... | G06F 12/0866 348/E5.008 |
| 6,032,224 A * | 2/2000 | Blumenau | ............... | G06F 12/08 710/15 |
| 6,718,427 B1 * | 4/2004 | Carlson | .................. | G06F 3/0617 360/48 |
| 7,546,431 B2 * | 6/2009 | Stacey | .............. | G06F 17/30067 707/999.104 |
| 7,546,432 B2 * | 6/2009 | Stacey | .............. | G06F 17/30221 707/999.202 |
| 8,180,742 B2 * | 5/2012 | Claudatos | ......... | G06F 17/30085 707/694 |

(Continued)

OTHER PUBLICATIONS

EMC DLm8000 Product Overview, May 2013, 15 pages, Part No. H11248, 2013 EMC Corporation (Year: 2013).*
Definition of condition; Merriam-Webster Online Dictionary; Jun. 13, 2016; retrieved from https://web.archive.org/web/20160613234153/ https://www.merriam-webster.com/dictionary/condition on Aug. 8, 2018 (Year: 2016).*

(Continued)

*Primary Examiner* — Daniel C. Chappell
(74) *Attorney, Agent, or Firm* — Workman Nydegger

(57) ABSTRACT

In one example, a method for managing data includes defining a policy concerning migration of a dataset, and the policy specifies a condition that the dataset is to be migrated from a first storage entity to a second storage entity after the passage of a length of time during which the dataset was not accessed. The policy is then associated with the dataset. Next, a determination is made as to whether the condition of the policy has been met, and when the condition of the policy has been met, the dataset is automatically migrated from the first storage entity to the second storage entity.

20 Claims, 4 Drawing Sheets

(56) References Cited

U.S. PATENT DOCUMENTS

| | | | | |
|---|---|---|---|---|
| 8,229,904 | B2* | 7/2012 | Claudatos | G06F 17/30085 707/694 |
| 8,239,584 | B1* | 8/2012 | Rabe | G06F 3/0605 710/8 |
| 8,626,514 | B2* | 1/2014 | Claudatos | G06F 17/30746 379/1.02 |
| 9,037,548 | B1* | 5/2015 | Dolan | G06F 3/0689 707/688 |
| 10,146,479 | B1* | 12/2018 | Tolstoy | G06F 3/0664 |
| 2005/0080992 | A1* | 4/2005 | Massey | G06F 3/0605 711/114 |
| 2006/0004868 | A1* | 1/2006 | Claudatos | G06F 17/30085 |
| 2007/0266056 | A1* | 11/2007 | Stacey | G06F 17/30221 |
| 2009/0100223 | A1* | 4/2009 | Murayama | G06F 3/0605 711/114 |
| 2014/0156877 | A1* | 6/2014 | Tylik | G06F 3/0605 710/18 |
| 2017/0277598 | A1* | 9/2017 | Dain | G06F 11/1451 |
| 2017/0277729 | A1* | 9/2017 | Dain | G06F 17/30303 |

OTHER PUBLICATIONS

Definition of requirement; Merriam-Webster Online Dictionary; Jun. 10, 2016; retrieved from https://web.archive.org/web/20160610063805/https://www.merriam-webster.com/dictionary/requirement on Aug. 8, 2018 (Year: 2016).*

Metrics to use on the road to HSM; Gast, J.; Digest of Papers, COMPCON'95, Technologies for the Information Superhighway; Mar. 5-9, 1995 (Year: 1995).*

Compass: Cost of Migration-aware Placement in Storage Systems; Verma et al.; Compass: Cost of Migration-aware Placement in Storage Systems; May 12-25, 2007 (Year: 2007).*

A prediction-based, data Migration Algorithm for hybrid Architecture NoC systems; Nafziger et al.; 23rd IEEE International SOC Conference; Sep. 27-29, 2010 (Year: 2010).*

An architecture for lifecycle management in very large file systems; Verma et al.; 22nd IEEE / 13th NASA Goddard Conference on Mass Storage Systems and Technologies; Apr. 11-14, 2005 (Year: 2005).*

EMC DLm8000 Product Overview, May 2013, 15 pages, Part No. H11248, 2013 EMC Corporation.

* cited by examiner

HEIRARCHICAL STORAGE FOR VIRTUAL TAPES

FIELD OF THE INVENTION

Embodiments of the present invention generally concern data backup and restoration. More particularly, at least some embodiments of the invention relate to systems, hardware, computer-readable media, and methods directed to processes for storing data and moving data based on hierarchical and/or other information associated with that data.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

While data backup is a valuable and important function, the ever increasing volume of data that is generated presents significant problems. In particular, many companies today find their backup and recovery process strained as data growth in enterprise IT environment continues to accelerate at exponential rates, while data-protection solutions have struggled to keep pace.

Some of the problems that are experienced in such environments concern the use of virtual tape systems for storage. For example, virtual tape data generated by an enterprise is typically stored locally at the enterprise on some type of storage device, or storage devices. However, it is often the case that this virtual tape data is accessed only rarely, if ever. Moreover, the local storage may be relatively expensive in terms of its capital costs and maintenance costs. Thus, a poor value proposition is presented insofar as an enterprise may find itself paying relatively significant costs to store data that may rarely, if ever, be accessed.

In light of problems and shortcomings such as those noted above, it would be useful to be able to move virtual tapes from primary storage to secondary storage, based on policies defined by a user. It would also be useful to implement policies in such a way that movement of the virtual tapes would occur automatically. Finally, it would be useful to be able to implement a policy that provides that a virtual tape will be moved from one storage to another storage after a defined period of non-use of the data of that virtual tape.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
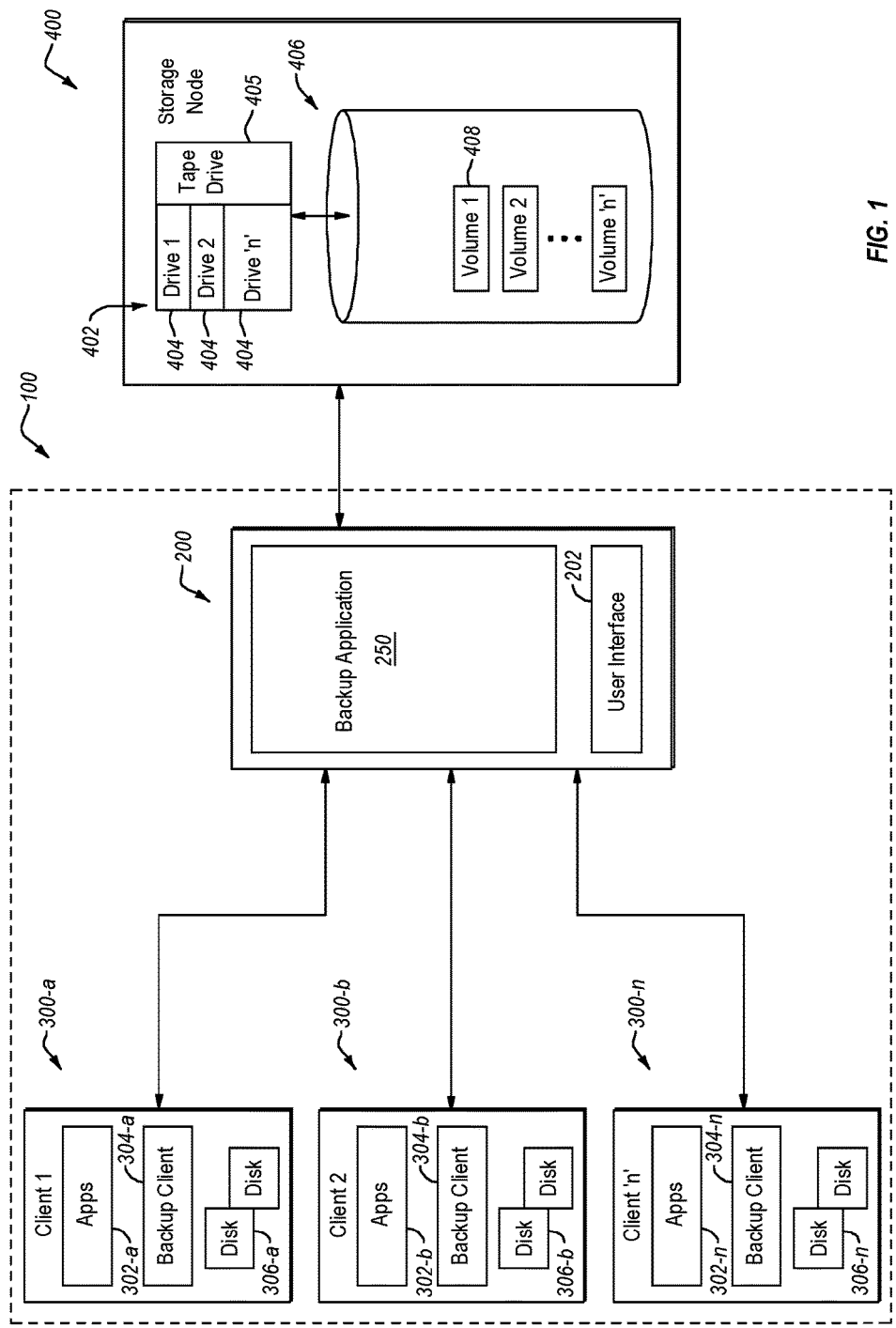
FIG. 1 is directed to aspects of an example operating environment for at least some embodiments.

Embodiments of the present invention generally concern data backup and restoration. More particularly, at least some embodiments of the invention relate to systems, hardware, computer-readable media, and methods directed to processes for storing data and moving data based on hierarchical and/or other information associated with that data.

It should be understood that the term 'backup,' as used herein, is intended to be broadly construed and is not limited to any particular type or form of backup. Thus, backup, as contemplated by this disclosure, embraces, but is not limited to, full backups, snapshots, incremental backups, de-duplicated backups, and any other circumstance or process where data that is desired to be protected is copied to one or more backup resources for protection.

As well, embodiments of the invention can be employed in connection with any type of data. As used herein, the terms 'data' and 'data element' are intended to be construed broadly and embrace, by way of example and not limitation, data blocks, atomic data, chunks, segments, emails, objects, files, blocks, file structures, directories, volumes, and any group of one or more of the foregoing. The data can be of any type, and the scope of the invention is not limited to any particular type, or types, of data.

In general, embodiments of the invention can provide for policy-based automatic migration of virtual tape data from one storage location and/or device to another storage location and/or device. In some instances at least, the storage where the virtual tape data initially resides may be relatively more expensive, in terms of capital costs and maintenance costs for example, than the storage to which that virtual tape data is subsequently migrated. The initial storage location can be located on-premises at an enterprise, while the storage location to which the on-premises virtual tape data is subsequently migrated can be a cloud storage location.

The policy, or policies, used to drive the data migration process can be of any type and can involve any parameter or group of parameters. In some embodiments, a policy can be defined and employed that specifies that virtual tape data of one or more virtual tapes will be moved from a first storage location to a second storage location if, during the time that the virtual tape data is stored in the first storage location, the virtual tape data is not accessed, or otherwise used, for a defined period of time. At least some embodiments of the invention provide for automatic migration of the virtual tape data upon satisfaction of the policy associated with that virtual tape data. Such policies may be referred to herein as data migration policies.

Advantageously then, at least some embodiments of the invention provide for cost-effective use of data storage, including in cases where data storage costs may vary from one data storage location or platform to another data storage location or platform. Moreover, embodiments of the invention can reduce administrative and processing overhead by automatically transferring data when one or more policies that have been associated with that data have been satisfied.

A. Example Operating Environments

In general, embodiments of the invention may include and/or be implemented in an operating environment that includes virtual tape archival storage systems and devices. These storage systems and devices can serve as primary storage, while other storage systems and devices can additionally be provided that serve as secondary storage. The virtual tape technology includes devices and systems appliances that mimic tape libraries for backing up systems to disk arrays. That is, the backup data is saved as though it were being stored on a tape, but the backup data is actually stored on a hard disk, for example, or other storage medium. The virtual tape approach can enable relatively faster disk-to-disk backups and data restoration in the period before the backup data is eventually archived on tape backup systems. Lower operating costs may also be realized by the use of virtual tape systems. In at least some instances, the virtual tape system is configured to decide whether data, which could be backup data, should be made available by way of a relatively fast medium such as disk cache for example, or should instead be written to tape.

Finally, it is sometimes the case that virtual tapes are accessed only rarely, if ever, after being stored in primary storage. Thus, example embodiments of the invention provide for migrating a virtual tape from primary storage to secondary storage upon satisfaction of the conditions of one or more policies that apply to that virtual tape.

With the foregoing in mind, attention is directed now to FIG. 1 which discloses one example of an operating environment that may be suitable for one or more embodiments of the invention. In FIG. 1, the example operating environment is denoted at 100 and may be a network such as a local area network, a wide area network, or any other networked configuration. Moreover, the operating environment 100, or any group of one or more of its elements, may comprise, form an element of, or constitute, a cloud computing environment. The operating environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a backup server 200 configured for communication with one or more nodes, such as one or more clients 300-*a*, 300-*b* and 300-*n*, and a storage node 400. The storage node 400 can include an input/output (I/O) controller 402 that includes one or more tape drives 404, which can be virtual tape drives, that can collectively be implemented as a tape drive array 405. The storage node 400 may also include a disk based storage system 406 that communicates with the I/O controller 402. When the backup server 200 writes data, such as by way of a tape drive 404, to one of the virtual tape volumes 408, the disk based storage system 406 stores that backup data as one or more tape volume images 408 that are included as part of a file system. The backup server 200 can include a user interface 202 that enables an administrator to control aspects of the operation of the backup server 200.

In general, backups of one or more of the clients 300-*a*, 300-*b* and 300-*n* can be made by cooperation between the backup server 200 and the clients 300-*a*, 300-*b* and 300-*n*, and the backups can then be stored by the backup server 200 at the storage node 400. Subsequently, one or more of the stored backups can be restored to one or more of the clients 300-*a*, 300-*b* and 300-*n* and/or any other target(s). The backup server 200, clients 300-*a*, 300-*b* and 300-*n*, storage node 400 and/or target(s) may be physical machines, virtual machines (VM), or any other suitable type of device.

As indicated by the phantom box in FIG. 1, the backup server 200 and clients 300-*a*, 300-*b* and 300-*n* can be integrated together into a single entity in some example embodiments. One example of such an entity is a mainframe computer with one or more backup applications. Accordingly, the scope of the invention is not limited to any particular arrangement of backup server 200 and clients 300-*a*, 300-*b* and 300-*n*.

One or more of the nodes, such as client 300-*a*, 300-*b* and 300-*n*, with which the backup server 200 communicates can take the form of a server. It is not required that the server be any particular type of server. One or more of the client(s) 300-*a*, 300-*b* and 300-*n* include any of various applications 302-*a*, 302-*b*, and 302-*n* that generate data that is desired to be protected. As well, the client(s) 300-*a*, 300-*b* and 300-*n* can each include a respective instance of a backup client 304-*a*, 304-*b*, and 304-*n* that generally operates in cooperation with the backup application 250 of the backup server 200 to create one or more backups that include data that is resident on storage media 306-*a*, 306-*b*, and 306-*n*, such as disks for example, of the client 300-*a*, 300-*b* and 300-*n*.

B. Example Storage Configuration

Figure 2:
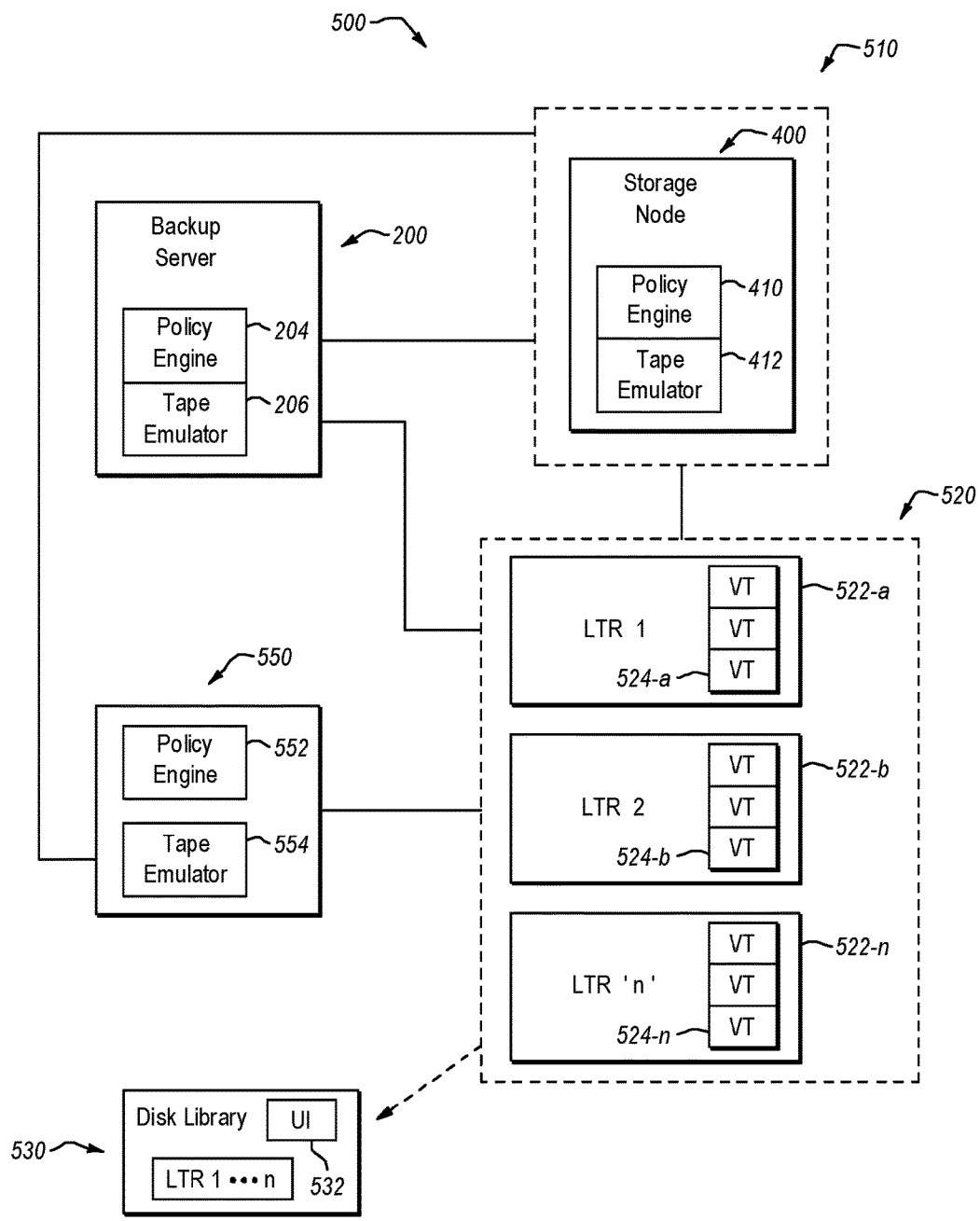
FIG. 2 is directed to an example data storage configuration.

With continued attention to FIG. 1, and directing attention now to FIG. 2 as well, details are provided concerning an example storage configuration 500 that can be employed in at least some embodiments of the invention. The storage configuration 500 can include primary storage 510, which can take the form of one or more storage nodes 400, an example of which was discussed above in connection with FIG. 1. In some example embodiments, the storage node 400 may comprise, consist of, or take the form of, a normal tapelib filesystem, examples of which are discussed in more detail in the attached Appendix A. In some embodiments, the primary storage 510 comprises first tier storage, and the secondary storage 520 comprises second tier storage. Examples of first tier storage and second tier storage are likewise disclosed in Appendix A.

The storage configuration 500 can also include secondary storage 520. The primary storage 510 and secondary storage 520 can communicate with each other. For example, and as discussed in more detail below, virtual tape data can be transferred from primary storage 510 to secondary storage 520 in accordance with one or more policies that apply to the virtual tape data.

In some embodiments, the primary storage 510 may reside locally at an enterprise, while the secondary storage 520 is located remotely from the enterprise. For example, the secondary storage 520 can take the form of cloud storage. However, no particular arrangement of the storage configuration 500 is required. As well, the cost/byte of storing data in the primary storage 510 may be relatively greater than the cost/byte of storing data in the secondary storage 520, though that may not be the case in every instance.

The example storage configuration 500 can also include a backup server, one example of which is the backup server 200 discussed in connection with FIG. 1. As well, the example storage configuration 500 can include systems and devices for managing the transfer of data from primary storage 510 to secondary storage 520. Thus, in some embodiments, a management server 550 is provided that communicates with the primary storage 510 and secondary storage 520. The management server 550 can include a policy engine 552 that can be operated by a user to define and apply policies for the management of virtual tape data that is, or will be, stored at one or more of the primary storage 510 and secondary storage 520. The management server 550 may additionally include a tape emulator 554, one example of which is the EMC Corp. Virtuent tape emulator, although the scope of the invention is not limited to that particular example. In general, the tape emulator 554 can render backup data in a form and manner that emulates storage of that data on tape.

In the immediately preceding example, certain management functions are implemented by way of a management server 550 that is a separate entity from other elements of the storage configuration 500, such as the backup server 200 and the storage node 400. In other embodiments however, some or all of the management server 550 functionality can be implemented as part of the backup server 200 or the storage node 400, for example. Thus, in one such alternative embodiment, the backup server 200 includes a policy engine 204 and a tape emulator 206. In still another embodiment, the storage node 400 includes a policy engine 410 and a tape emulator 412. As these examples demonstrate, the management server functionality need not be tied to any particular computing entity.

Regardless of where or how it is implemented, a policy engine such as policy engine 552 can be operated by a user to generate one or more policies that dictate for example, any one or more of, what data will be migrated, when/under what conditions the data will be migrated, and the location and destination of the data. Policies can be added, modified or deleted by a user using the policy engine.

As further indicated in FIG. 2, the storage configuration 500 can also include a disk library 530 that includes, as one of its elements, the secondary storage 520 and LTR storage units 522-a, 522-b, and 522-n discussed below. In some embodiments at least, the disk library 530 takes the form of the EMC Corp. tape replacement and augmentation product DLm (Disk Library for mainframe). The LTR storage units of the disk library 530 can be accessed for operations such as read and write operations, for example, by a tape emulator, such as the tape emulator 554.

In more detail, the secondary storage 520 may include one or more long term retention (LTR) storage units 522-a, 522-b, and 522-n. Each of the LTR storage units 522-a, 522-b, and 522-n may include one or more backups in the form of virtual tape data archive 524-a, 524-b, and 524-n. In some embodiments, the LTR storage units 522-a, 522-b, and 522-n may comprise, consist of, or take the form of, an LTR filesystem, examples of which are discussed in more detail in the attached Appendix A. Further information concerning aspects of example LTR storage units and related functions and operations are likewise disclosed in the attached Appendix A. In some instances, the virtual tape data archives 524-a, 524-b, and 524-n can be read by the backup server 200 and/or the storage node 400. For example, the backup server 200 can read a virtual tape data archive 524-a, 524-b, and 524-n for restoration to one or more target machines, such as a client 300-a, 300-b and 300-n for example.

With continued reference to FIG. 2, further details are provided concerning aspects of some example LTR storage and LTR storage units. In at least some embodiments, a user can designate particular filesystems as LTR storage. This can be performed, for example, by way of a user interface (UI) 532 at a disk library, such as the disk library 530 for example. The LTR storage units 522-a, 522-b, and 522-n can be designated as read only, or read-write. A user can likewise access virtual tape data in the LTR storage units 522-a, 522-b, and 522-n by way of the disk library UI 532.

C. Example Host Configuration

Figure 3:
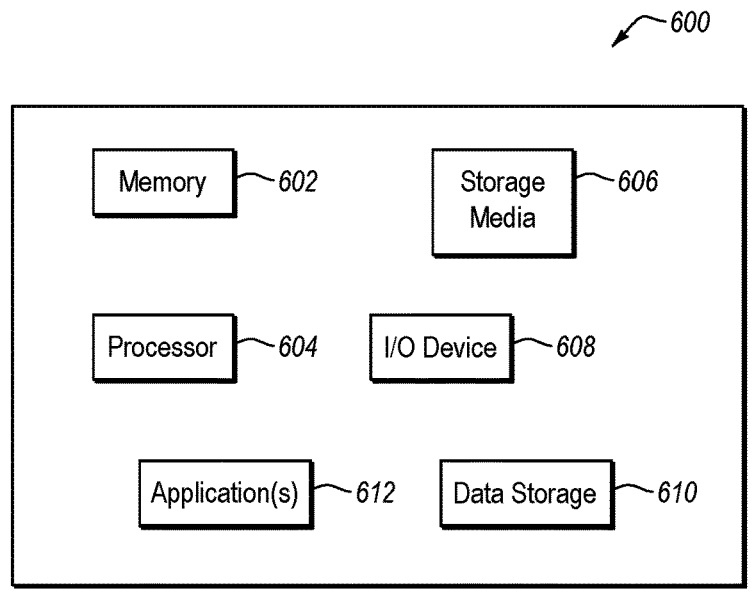
FIG. 3 is directed to an example implementation of a physical computing device.

With reference briefly to FIG. 3, one or more of the backup server 200, clients 300-a, 300-b and 300-n, storage node 400, primary storage 510, secondary storage 520, disk library 530, and management server 550, can take the form of a physical computing device, one example of which is denoted at 600. In the example of FIG. 3, the computing device 600 includes a memory 602, one or more hardware processors 604, non-transitory storage media 606, I/O device 608, and data storage 610. As well, one or more applications 612 are provided that comprise executable instructions. Such executable instructions can take the form of one or more of a backup application, a restore application, a backup client, an application for controlling tape drive operations, a tape emulator, or a policy engine, to name a few examples.

D. Aspects of Example Policies and Related Processes

Figure 4:
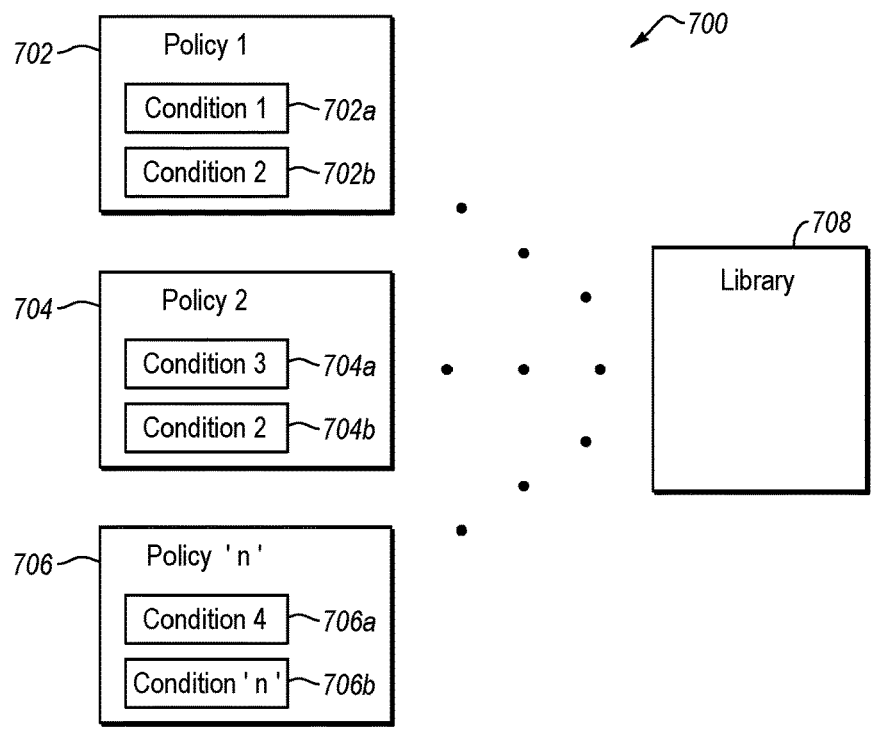
FIG. 4 discloses aspects of example policies.

With continued reference to FIG. 3, and directing attention as well to FIG. 4, further details are provided concerning the definition and use of policies that can be used in the management of data. In general, and as disclosed elsewhere herein, policies can be defined and applied that control the migration of data, such as virtual tape data, from one storage system to another storage system. The virtual tape data may initially reside in a first tier storage system and may subsequently be transferred or migrated to another storage system, such as a second tier storage system. The migration of the virtual tape data can be performed as dictated by one or more policies, which can be user-defined. In this way, infrequently used virtual tape data can be moved from a relatively more expensive storage system to a relatively less expensive storage system when one or more conditions specified in a policy have been met. For example, if a virtual tape data file system stored in a first tier storage is not mounted, such as by the tape emulator, in 'X' days, that virtual tape data file system may be migrated automatically to second tier storage.

In more detail, and as indicated in the examples of FIG. 4, a variety of policies 700 can be defined, each with its own set of one or more conditions. In the illustrated example, policies 702, 704 and 706 have been defined. The policies 700 can be stored in a library 708 for use by a user. The policies 700 can be added, modified, or deleted to/from the library 708. The library 708 can, for example, be included in a management server such as the management server 550 for example, in a storage node, or in a backup server. Each policy 700 can specify one or more aspects of the data to which it applies, and these aspects can be considered as conditions that must be met before the policy 700 is applied. Thus, each policy 700 can take an 'if X is true, then do Y' form such that 'if' one or more specified conditions are met, 'then' the policy 700 will be applied. As noted in FIG. 4, the policy 704 can include conditions 704a and 704b, while the policy 706 can include conditions 706a and 706b.

By way of example, the indicated action 'Y' may be that the data to which the policy 700 applies will be moved from first tier storage to second tier storage if the condition(s) 'X' are satisfied. One example of such a condition 'X' is the condition 702a, which is that the data has not been accessed for a certain length of time, or is only accessed 'n' number of times in a timeframe of defined length. As an illustration of this example, data that is accessed 5 or fewer times in a year may be deemed to have satisfied condition 702a.

It was noted above that the frequency with which virtual tape data is accessed, or not, can form a basis for application of a policy. As used herein, the term 'access' and its forms are intended to be broad in scope. Thus, such access can include, for example, one or both of a read operation, and a write operation. With continued reference to the example above, the length of time can be any desired length and in some embodiments, has no specific start or end time. In other embodiments, the length of time can be measured from a specific starting time. The condition 702a thus addresses the circumstance where the data to which the policy 702 applies is accessed only infrequently, or never, during the specified length of time. Data that is accessed only infrequently can thus be transferred to second tier storage that may be relatively less expensive, such as on a cost/byte basis for example, than first tier storage.

As a further example, the policy 702 can also include a condition 702b that specifies that the policy 702 is only to be applied to, for example, a particular type of virtual tape data, a particular virtual tape file structure, or virtual tape data stored at a particular first tier storage location. When conditions 702a and 702b have been determined to have been met, the associated data is then moved from first tier storage to second tier storage, such as at the end of the one year period in the aforementioned example. This movement of data can be performed automatically upon satisfaction of the condition(s) that make up the policy 702.

As a final example, at least one policy can be based on the size of a group of stored data, such as particular virtual tape data file system. In particular, the policy can specify that the virtual tape data file system will be moved from first tier to second tier storage its size exceeds a specified size, which could be measured for example in Kb, Mb, or Gb.

In some embodiments, a tape emulator, and/or other entity, can monitor the data in first tier storage to determine whether or not the applicable conditions have been met and, when a determination has been made that the conditions are met, the monitor can then apply, or cause the application of, the policy 702. The monitoring and application of the policy can be performed automatically, such as by a tape emulator for example, without having been initiated by a user. Thus, in some embodiments at least, all a user need do is define a policy, after which point the processes of monitoring and data migration are performed automatically without further intervention or involvement by the user.

E. Aspects of Some Example Processes

Figure 5:
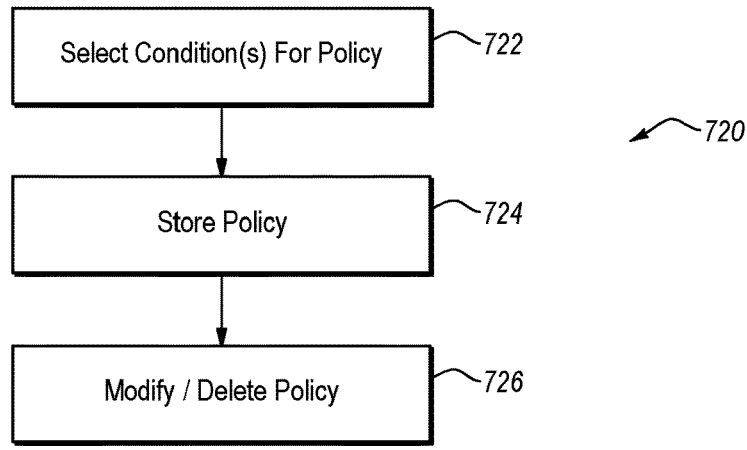
FIG. 5 is a flow diagram disclosing aspects of a process for handling policies.

Turning now to FIG. 5, details are provided concerning aspects of processes for defining a policy, one example of which is denoted generally at 720. Part or all of the method 720 can be performed by a user by way of a tape emulator, although that is not required in all embodiments and the method 700 can be performed by any other suitable entity, or entities.

The process 720 can begin when a user selects 722 one or more conditions that will collectively make up the policy, which can also be referred to herein as an LTR policy. In some embodiments, the conditions selected for policy include: the "from" tapelib and class; the "to" LTR filesystem (which may be implicitly defined by the naming-convention association with the tapelib (e.g. /tapelibPROD is associated with /ltr/tapelibPROD), and the target class will be the same as the source class (e.g., tapes in tape library filesystems of class 4 will be moved to an LTR filesystem of class 4 as well); the age, specified in number of days, at which time a tape should be migrated to LTR storage; the minimum file size specified in Kb/Mb/Gb; type of modification for moved tape (compressed/AMDD/nothing); the length of time, specified in number of hours, between when a tape is migrated to LTR storage and when it is deleted from the first tier storage (e.g., tapelib storage); the maximum number of tapes that should be moved concurrently for this policy on each of the specified virtual tape engines (VTE); and, the VTE(s) which on which the LTR migration tasks should run (the maximum number of tasks will be stated on each of the VTEs specified). Optionally, the policy can also include limits as to the day(s) of the week and time(s) of day to perform the moves, so that they can be scheduled according to the user's needs. These options will be "include these days/hours" and "exclude these days/hours." Further information concerning example policies and the aforementioned conditions is disclosed in Appendix A hereto.

After the conditions have been selected 722, the policy is then considered to be defined. The defined policy can then be stored 724, such as in a library for example. Finally, if desired, a previously created policy can be modified, or deleted, 726 from the library.

Figure 6:
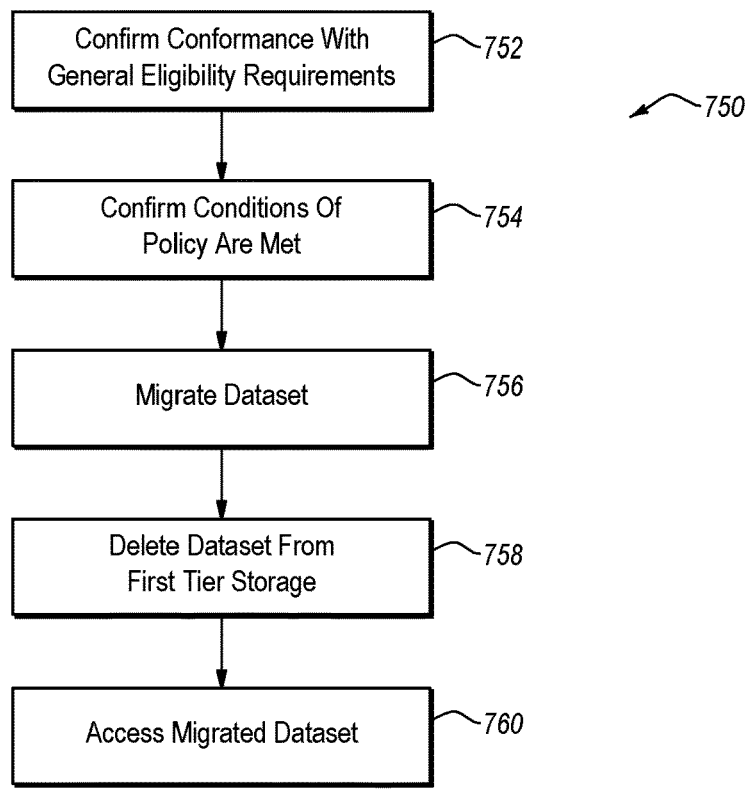
FIG. 6 is a flow diagram disclosing aspects of a process for migrating a dataset.

Turning now to FIG. 6, details are provided concerning aspects of processes for migrating data, such as a dataset that comprises or consists of virtual tape data, from a first data storage to a second data storage in accordance with one or more policies, where one example of such a process is denoted generally at 750. Part or all of the method 750 can be performed by a user by way of a tape emulator, although that is not required in all embodiments and the method 750 can be performed by any other suitable entity, or entities. The method 750 can be performed in connection with a combination of storage including first tier storage such as tapelib storage and second tier storage such as LTR storage.

The method 750 can begin when conformance of a dataset to a set of general eligibility requirements is confirmed 752. In some instances, all of the datasets to which a policy applies can be monitored for any tapes, that is, virtual tape data, that are eligible to be migrated. The tape(s) determined to be eligible can be marked for migration, as specified in their respective policies. The eligibility requirements can be separate from, or part of, a policy. One or more of the eligibility requirements can be generally applicable to all datasets that may potentially be migrated. For example, one eligibility requirement that may be implemented across multiple different datasets is that in order for the dataset to be eligible for migration, that dataset must be a read-write dataset rather than, for example, a read-only dataset. In other cases, it is permissible for the dataset to be a read-only dataset. The process 752 can be performed recursively until conformance is confirmed.

If, or when, conformance of a dataset to the general eligibility requirements is confirmed 752, the conditions of the policy, or policies, applicable to the dataset can be evaluated. In particular, a determination is made 754, for a particular dataset, as to whether or not all the conditions of a policy that applies to that dataset have been met. As noted herein, the dataset can be any grouping of data, such as a file for example, and one of the conditions can be that the dataset must not have been accessed for a defined length of time. When the conditions of the applicable policy or policies have been met, the dataset is then ready to be migrated.

Thus, the method 750 then continues and the dataset is migrated 756 from a first storage entity to a second storage entity such as, for example, from tier 1 storage to tier 2 storage. The data migration may, but need not necessarily, occur immediately upon satisfaction of the conditions of the policy. Where a policy specifies that a dataset will not be migrated until after the passage of a defined length of time during which the dataset was not accessed, that defined length of time may simply be a minimum, since it may not always be possible to migrate the dataset immediately upon satisfaction of the conditions in the policy. As used herein, 'migration' and its forms are intended to be broad in scope and include, for example, copying data from a first storage entity to a second storage entity.

After the dataset has been migrated from the first storage entity to the second storage entity in accordance with the policy, or policies, associated with that dataset, the copy of the dataset remaining in the first storage entity can be deleted 758. The deletion 758 of the dataset can be performed immediately, at a particular time, or delayed until after the passage of a set period of time. In any event, the deletion time of the dataset from the first storage entity can be defined by a user and may form part of a policy, or may be defined and implemented separately from any policy.

Finally, the migrated dataset can be accessed 760. Such access, which can occur by way of the disclosed management server, or another entity, can include, for example, reading out data from the migrated dataset and/or writing to the migrated dataset. The migrated dataset may be read out, for example, if there is a need to restore the dataset to a target, such as a client. Finally, accessing 760 the migrated dataset can also include both deleting the migrated dataset, and moving the migrated dataset to another destination.

F. Further Aspects of Example Embodiments

Further aspects of some example embodiments are disclosed in the Appendix A hereto. Appendix A is incorporated herein in its entirety by this reference. The disclosure of Appendix A is not intended to limit the scope of the invention in any way and is presented only by way of example.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for managing data, comprising:
defining a policy concerning migration of a dataset, wherein the policy specifies a plurality of conditions, one of which is that the dataset is to be migrated from a first storage entity to a second storage entity after the passage of a length of time during which the dataset was not accessed, wherein the plurality of conditions include one mandatory condition and one non-mandatory condition;
associating the policy with the dataset;
determining whether the dataset has met eligibility requirements, where the eligibility requirements comprise:
a virtual tape that includes the dataset is an active tape;
a source filesystem in which the virtual tape resides is not a read-only filesystem; and
a last-changed time of the virtual tape plus an age specified in the policy is greater than a current time;
when the dataset has been determined to have met the eligibility requirements, then determining if the mandatory condition of the policy has been met; and
when the dataset has met the eligibility requirements and after the mandatory condition of the policy has been met, using a virtual tape emulator to migrate the dataset from the first storage entity to the second storage entity.

2. The method as recited in claim 1, wherein the eligibility requirements are a part of the policy.

3. The method as recited in claim 1, wherein the dataset comprises virtual tape data.

4. The method as recited in claim 1, wherein the policy is defined notwithstanding that one or both of a source filesystem and a target filesystem do not exist at the time the policy is defined.

5. The method as recited in claim 1, wherein the dataset is migrated automatically from the first storage entity to the second storage entity after the mandatory condition of the policy has been met and after the dataset has been determined to meet the eligibility requirements.

6. The method as recited in claim 1, wherein the migrated dataset is a copy of the dataset in the first storage entity, and further comprising deleting the dataset from the first storage entity after the dataset has been migrated to the second storage entity.

7. The method as recited in claim 1, further comprising enabling access to the dataset stored at the second storage entity.

8. The method as recited in claim 1, further comprising monitoring, with the virtual tape emulator, the first storage entity to determine when the eligibility requirements and policy conditions have been met.

9. The method as recited in claim 1, wherein the migrated dataset is either a read-write dataset, or a read-only dataset.

10. The method as recited in claim 1, wherein only migrated datasets reside in the second storage entity.

11. A non-transitory storage medium having stored therein computer-executable instructions which, when executed by one or more hardware processors, perform operations comprising:
   defining a policy concerning migration of a dataset, wherein the policy specifies a plurality of conditions, one of which is that the dataset is to be migrated from a first storage entity to a second storage entity after the passage of a length of time during which the dataset was not accessed, wherein the plurality of conditions include one mandatory condition and one non-mandatory condition;
   associating the policy with the dataset;
   determining whether the dataset has met eligibility requirements, where the eligibility requirements comprise:
      a virtual tape that includes the dataset is an active tape;
      a source filesystem in which the virtual tape resides is not a read-only filesystem; and
      a last-changed time of the virtual tape plus an age specified in the policy is greater than a current time;
   when the dataset has been determined to have met the eligibility requirements, then determining if the mandatory condition of the policy has been met; and
   when the dataset has met the eligibility requirements and after the mandatory condition of the policy has been met, using a virtual tape emulator to migrate the dataset from the first storage entity to the second storage entity.

12. The non-transitory storage medium as recited in claim 11, wherein the one or more eligibility requirements are a part of the policy.

13. The non-transitory storage medium as recited in claim 11, wherein the policy is defined notwithstanding that one or both of a source filesystem and a target filesystem do not exist at the time the policy is defined.

14. The non-transitory storage medium as recited in claim 11, wherein the dataset is migrated automatically from the first storage entity to the second storage entity after the mandatory condition of the policy has been met and after the dataset has been determined to meet the eligibility requirements.

15. The non-transitory storage medium as recited in claim 11, wherein the migrated dataset is a copy of the dataset in the first storage entity, and the operations further include deleting the dataset from the first storage entity after the dataset has been migrated to the second storage entity.

16. The non-transitory storage medium as recited in claim 11, wherein the operations further comprise monitoring, with the virtual tape emulator, the first storage entity to determine when the eligibility requirements and policy conditions have been met.

17. The non-transitory storage medium as recited in claim 11, wherein the migrated dataset is either a read-write dataset, or a read-only dataset.

18. The non-transitory storage medium as recited in claim 11, wherein only migrated datasets reside in the second storage entity.

19. The non-transitory storage medium as recited in claim 11, wherein the dataset comprises virtual tape data.

20. The non-transitory storage medium as recited in claim 11, wherein the operations further comprise
   monitoring a directory designated by the policy to identify a tape that meets the eligibility requirements.

* * * * *